United States Patent [19]
Holzhauer et al.

[11] Patent Number: 5,647,997
[45] Date of Patent: *Jul. 15, 1997

[54] WASTE WATER TREATMENT WITH PERACID COMPOSITIONS

[75] Inventors: Frederick W. Holzhauer; Dana J. Johnson, both of Broomfield; Terry McAninch, Westminster, all of Colo.

[73] Assignee: Birko Corporation, Henderson, Colo.

[*] Notice: The term of this patent shall not extend beyond the expiration date of Pat. No. 5,472,619.

[21] Appl. No.: 567,022

[22] Filed: Dec. 4, 1995

Related U.S. Application Data

[63] Continuation-in-part of Ser. No. 116,364, Sep. 3, 1993, Pat. No. 5,472,619.
[51] Int. Cl.$^6$ .................. C07F 1/72; C07F 1/24; B03D 1/008
[52] U.S. Cl. .................. 210/721; 210/705; 210/759
[58] Field of Search .................. 210/721, 705, 210/759

[56] References Cited

U.S. PATENT DOCUMENTS

| | | | |
|---|---|---|---|
| 3,510,424 | 5/1970 | Zumbrunn | 210/759 |
| 3,645,893 | 2/1972 | Rohrer | 210/50 |
| 3,716,566 | 2/1973 | Sansoni et al. | 210/759 |
| 4,017,392 | 4/1977 | Hamer et al. | 210/54 |
| 4,051,058 | 9/1977 | Böwing et al. | 252/186 |
| 4,051,059 | 9/1977 | Böwing et al. | 252/186 |
| 4,108,771 | 8/1978 | Weiss | 210/50 |
| 4,129,517 | 12/1978 | Eggensperger et al. | 252/186 |
| 4,321,143 | 3/1982 | Wilms et al. | 210/759 |
| 4,443,342 | 4/1984 | Stas et al. | 210/759 |
| 4,587,264 | 5/1986 | Jourdan-Laforte et al. | 514/557 |

FOREIGN PATENT DOCUMENTS

| | | | |
|---|---|---|---|
| 48290 | 5/1981 | Japan | 210/759 |
| 34792 | 2/1985 | Japan | 210/759 |
| 9215529 | 9/1992 | WIPO | 210/759 |

*Primary Examiner*—Neil McCarthy
*Attorney, Agent, or Firm*—Dorsey & Whitney LLP

[57] ABSTRACT

A process for the separation and purification of fat-containing waste water including the step of adding an effective flocculating and oxidizing amount of a composition comprising:

- 10–30% wt. peracid precursor
- 15–70% wt. hydrogen peroxide
- 1–10% wt. phosphoric acid
- bal. water The process may also include the addition of ferrous sulfate or other source of ionic iron to accelerate the action of the peracid composition.

15 Claims, 1 Drawing Sheet

WASTE WATER TREATMENT WITH PERACID COMPOSITIONS

This application is a continuation-in-part of patent application Ser. No. 08/116,364 filed Sep. 3, 1993 now U.S. Pat. No. 5,472,619.

BACKGROUND OF THE INVENTION

This invention relates generally to the field of treating waste water, particularly waste water containing fats and fatty acids, such as that produced in meat-packing plants. In particular, the invention includes both methods and compositions for the improved separation and purification of fat-containing waste waters.

Water is used in large amounts in meat-packing plants both to clean the facility and in the actual processing of animal or poultry carcasses. For example, water is used in the chillers to rapidly cool the carcasses from body temperature to an intermediate temperature prior to refrigeration or freezing. The chilling preserves the meat and inhibits the growth of bacteria. The water used in both cleaning and chilling operations carries fat and fatty acids and is laden with those materials after the water has served its purpose. It also contains solid materials and microbiological constituents that result in a high biological oxygen demand ("BOD") and suspended solids in the water.

Typically, the waste water utilized in various parts of a meat-packing facility is unsuitable for direct discharge into a stream. Treatment by municipal water facilities is expensive.

Since the waste water contains some useable materials from which additional byproducts and revenue can be obtained, it is preferable to recover these materials as economically as possible before sending the effluent to municipal water treatment facilities. To that end, the fat-containing waste waters from various portions of the plant typically are combined and subjected to mechanical separation in holding tanks, clarifiers or dispersed air flotation ("DAF") equipment to produce three distinct materials: (1) inedible fat concentrate, (2) water and (3) solids.

The inedible fat concentrate is typically cooked to produce meal and tallow. It may be blended either before or after cooking with higher grade fats to produce a range of tallow products suitable for both pet food and soap. These by-products of the meat-packing process provide a not insignificant amount of revenue to meat packers. The tallow retrieved from the waste water is generally of poor quality and represents a small percentage of the total inedible tallow from a typical meat-packing plant. Although the proportion is small; it influences the quality of the entire inedible tallow with which it is blended.

The quality and value of the tallow are generally judged by its color and free fatty acid ("FFA") content. These criteria are not independent. A dark color generally means a high free fatty acid content. It is because of this relationship that the determination of the free fatty acid content is used to evaluate the inedible tallow. Under normal operating conditions the free fatty acid content of the tallow can vary between 3 and 85 weight percent. A free fatty acid content higher than about 4 percent is generally undesirable, particularly for soap stock, known in the trade as "bleachable fancy."

The sludge in the bottom layer from the separation is usually pumped or augured out of the equipment, then treated if necessary prior to land application.

The quality of the water recovered from the fat-containing waste water stream is generally measured by its BOD and the total suspended solids ("TSS"), which is usually expressed in weight per unit volume. The measured BOD and TSS values are used to determine the acceptability of the waste water for discharge and the fees associated with that discharge. Whether the water is discharged into a natural stream or sewer, the fees for discharging the effluent are determined, among other things, upon the discharged water's quality. The greater the BOD or TSS values, the greater the fee to discharge the water. Depending on the municipality involved, other qualities of the water or limitations may impact the fees for disposing it. These include the temperature, chemical oxygen demand ("COD"), or ammonia content of the water, generally measured as total Keldahl nitrogen ("TKN").

Although purification of the water at the meat-packing plant decreases the fees associated with its ultimate discharge, it is not possible to totally purify fat-containing waste water streams at a manufacturing facility. Improvements in the treatment of fat-containing waste water which can enhance the quality of both the fat containing byproducts and the effluent, increase the value of the former and decrease the cost associated with discharge of the latter. Thus, compositions and processes of the present invention are quite valuable.

OBJECTS OF THE INVENTION

It is an object of the present invention to present an improved method for the efficient separation and purification of fat-containing waste waters, such as that generated from meat-packing facilities, into fat, waste water, and sludge.

It is an additional object of the present invention to present an improved process for the purification of fat-containing waste waters which produces improved fat containing by-products and improved quality of the discharged water.

Finally, it is an object of the present invention to present an improved process for the purification of fat-containing waste waters which utilizes chemical ingredients that produce minimum harm to the purification equipment, are biodegradable and are safe should they find their way into the food chain.

These and other objects of the invention can be achieved utilizing the processes and compositions described herein.

SUMMARY OF THE INVENTION

Figure 1:
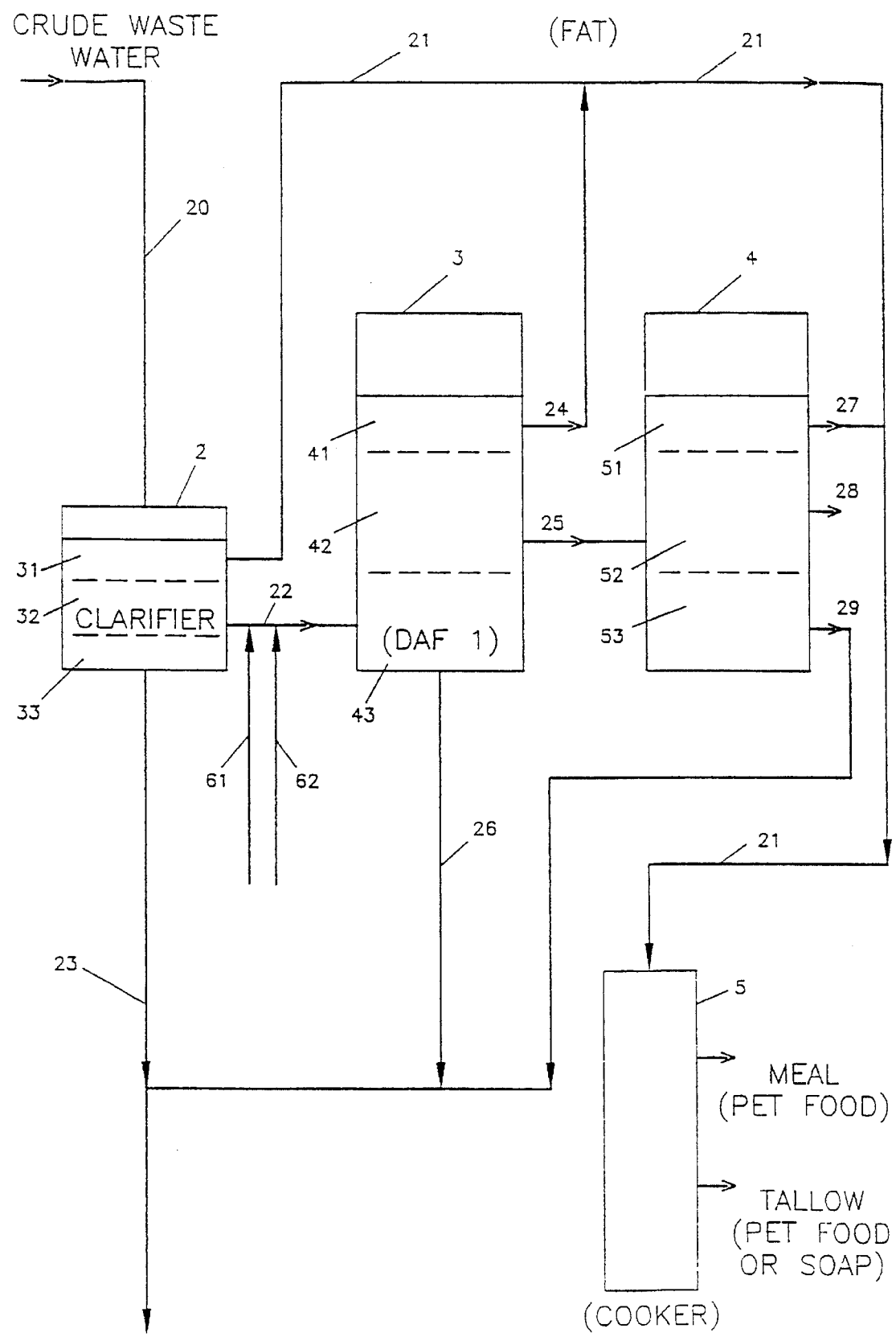
FIG. 1 is a schematic showing one embodiment of the process of this invention, including the sequence of process steps in that embodiment.

We have now discovered a simple, efficient method for the purification of fat-containing waste water, particularly that produced in a meat-packing plant. The process includes the introduction of certain compositions which have not been previously utilized for this purpose. In particular, the process includes the addition of peracid compositions containing the following ingredients in the weight ranges indicated:

10–30% wt. peracid precursor
15–70% wt. hydrogen peroxide
1–10% wt. phosphoric acid
bal. water As described in our earlier patent, we had initially found that peracetic acid was appropriate for this purpose. We have subsequently found that other peracids, notably perbutyric acid, percitric acid, and perproprionic acid are also effective for this purpose. The peracids may be used individually or in combination with one another.

In addition to the foregoing ingredients, if the composition will be stored for any appreciable period of time, the composition should also include from 0.1–1% of a peracid stabilizer. The stabilizer is typically selected from the group consisting of phosphonic acid derivatives, picolinic acid or any other sequestering agent that tightly binds trace metals. In addition, a divalent metal ion, especially an iron containing material, such as ferrous sulfate, can be added with or following addition of the peracid composition to the waste water to accelerate the purification.

The peracid and iron-containing material are added to the waste water prior to clarification or introduced into the dispersed air filtration equipment to facilitate flocculation and removal of the fat. The quality of the fat and the purified waste water are also significantly improved.

A number of different materials have previously been added to clarifiers to assist in the treatment of fat-containing waste water. These include the use of flocculating agents and materials that may assist in oxidation of the water and its constituents. Chlorine and peroxide, for example, have been known to assist in the oxidation process. (See, e.g., U.S. Pat. No. 4,321,143 to Wilms et al.) In one instance, peroxide alone has been identified as assisting in flocculation as well. (See, U.S. Pat. No. 4,913,826 to Mannig et al.) Generally, however, it is difficult to find materials that assist in both the physical separation and the chemical purification of the water.

Recently, there have been some attempts to use polymers to assist in the flocculation of fat-containing waste waters. (See, e.g., U.S. Pat. No. 4,790,943 to Dunn et al.) However, these efforts have not been particularly successful, and, in at least one case, have been a significant failure. The fat produced in that instance was dark red/brown in color, rather than clear, making it unacceptable for further processing. In addition, polymers should not be used if they may ultimately enter the food chain.

Peracids are the oxygen-containing form of the precursor acid, e.g., perproprionic acid is the oxygen containing form of proprionic acid. In concentrated amounts the peracids are explosive, and for this reason the Department of Transportation limits the concentration of peracids in shipments. For example, peracetic acid is limited to a concentration of 42% or less. In fact, peracid compositions are generally produced in solutions far less concentrated than the maximum permitted by the DOT. Because of their explosive and corrosive characteristics, peracids are usually manufactured as aqueous mixtures, in thermodynamic equilibrium or kinetically stabilized for their intended application. For example, typical peracetic acid compositions include hydrogen peroxide, acetic acid, and a catalytic acid, usually but not exclusively mineral acids, the most common being sulfuric acid.

Peracetic acid has microbicidal properties and has been traditionally utilized as a hard surface cleaner. (See, e.g., U.S. Pat. Nos. 4,051,058 and 4,051,059 to Bowing et al.) When used for that purpose, peracetic acid, which attacks microorganisms quickly, is typically blended with another long-term sanitizer. The other sanitizer is likely to be a quaternary ammonium chloride salt, as chloride ion greatly accelerates the action of peracetic acid on nitrogen containing materials.

Although peracetic acid is known as a bactericide (i.e., germicide), peracetic acid and the other peracids are not known as flocculants or as materials useful in the commercial separation or purification of waste water, particularly the treatment of fat-containing waste water. In fact, commercially available compositions containing peracetic acid are not acceptable for waste water treatment. Among other things, these materials typically are based on sulfuric acid, which renders them deleterious to metal processing equipment, such as, clarifiers and dispersed air flotation equipment, and is known to darken the fat concentrate. In addition, the solutions are generally so dilute, that large quantities would be required to effectively process the waste water.

It has now been discovered that certain peracid compositions are quite beneficial in the treatment of fat-containing waste waters. These materials act as flocculating agents, control odor and microorganisms and lower BOD, COD, TSS and TKN. The quality of the fat concentrates recovered is significantly better.

DESCRIPTION OF THE INVENTION AND THE PREFERRED EMBODIMENT

We have now discovered a process for the efficient and effective purification of fat-containing waste water, particularly that generated in meat-packing operations. This includes the addition of:

10–30% wt. peracid precursor

15–70% wt. hydrogen peroxide

1–10% wt. phosphoric acid bal. water

The peracid precursor should include at least one acid selected from the group consisting of butyric, citric, proprionic and acetic acid. In addition, if the ingredients are mixed and stored in advance, they should also include 0.1–1% of a peracid stabilizer selected from the group comprising phosphonic acid derivatives, picolinic acid, or any other sequestering agent that tightly binds trace metals.

Waste water treatment with the peracid compositions of this invention involves the continuous or sequential introduction of the peracid composition in an amount proportional to the flow of waste water effluent from the plant. The peracid compositions can be added to the effluent before it enters the treatment apparatus or between stages in the treatment including the recycle streams, if any. In a preferred embodiment of the invention, ferrous sulfate is dispensed with the peracid composition as an accelerator. Additional chemical treatment, such as pH control may be employed to enhance kill rates, or to control growth of problem organisms, or to meet waste water specifications, on a case-by-case basis. For example, mineral acids or caustic soda may be used for pH control. Quaternary amine salts or benzoic acid salt may be used to assist in biocidal action.

The peracid compositions of this invention may be used in any situation in which fat-containing waste water is to be purified. In this regard "fat-containing waste water" is intended to include fat-containing aqueous material with significant COD and BOD. Among other things, this includes waste from offal operations; washdown from any edible processing area, or edible tallow processing or rail car wash; hide fleshing; rendering area leaks and blowdowns; and carcass washing.

While not wishing to be bound by any theory of operation, it appears, at the present time, that the various ingredients in the peracid compositions of the present invention have a number of functions. The peracid component assists flocculation and appears to be the primary oxidizer. Hydrogen peroxide is also a flocculant and oxidizer. The phosphonic acid derivative is a stabilizer that prevents decomposition, i.e., "offgassing," due to trace catalytic metal ion contamination, e.g., copper and iron. In addition, the peracid precursor and hydrogen peroxide are ingredients for the preparation and equilibrium concentration of the peracid. The phosphoric acid is a catalytic acid for the formation of peracid; it also assists in corrosion control.

The peracid compositions of the invention may be added prior to or in the course of any of the separation steps typically employed to physically separate the various fat, water and solid constituents in the waste water. This includes settlement, clarification and dispersed air flotation. The use of peracid in connection with dispersed air flotation is particularly useful in separating the constituents in fat-containing waste waters.

The peracid compositions of the invention may be used with and to enhance the activity of other commercially available additives for waste water treatment, as shown for instance in Example 1, or may be used by themselves, as shown in Examples 2 and 3.

Dose rates are usually application-specific. Typically, dosage rates sufficient to deliver from 20-150 ppm. active peracid based on the amount of waste water are utilized, although any amount that effects flotation and oxidation of the waste water can be employed.

One embodiment of the process of the present invention is shown in FIG. 1, which depicts a typical arrangement of waste water separation and purification equipment associated with meat-packing plant 1. Waste water from the various operations in the plant is introduced and combined via line 20 into clarifier or holding tank 2. In this vessel an initial, crude separation is performed into fat containing upper portion 31, partially purified waste water 32 and bottom solids 33. The fat containing upper portion is sent via line 21 to cooker 5, and the solids are removed via line 23 to ultimate discharge. The cooker produces meal, typically referred to as "meat meal," a precursor for pet food, and tallow, which is also processed into either pet food or soap. The partially purified waste water from zone 32 is passed via line 22 to dispersed air flotation tank 3.

As the waste water is transported from clarifier 2 through line 21 to flotation tank 3, the peracid composition is added to it through line 61. In addition, an iron containing compound may be introduced via line 62 simultaneously with the peracid composition to assure proper mixing and acceleration of the peracid compounds's effect. The peracid assists in the flocculation in tank 3. Again, a top layer of fat 41 is produced, a middle layer of still incompletely purified waste water 42 and a bottom layer of solids 43. The fat layer is transported through line 24 into line 21 and processed in cooker 5. The solids layer is removed via line 26 and combined with the solids layer from the clarifier and the intermediate layer is sent to dispersed air flotation tank 4 for a final separation and purification step.

In tank 4, a final layer of fat 51 is formed which is removed via line 27 and combined with the other fat containing materials in line 21. The bottom layer 53 of solids is removed via line 29 and combined with the other solids from the clarifier and the first dispersed air flotation tank. The middle layer 52 of waste water is removed via line 28 and is discharged into a stream or into a water purification plant as appropriate.

The process of this invention is not limited to a particular arrangement or number of settling, clarifying or dispersed air flotation devices. Its benefits may be produced by the addition of the peracid composition into any equipment in which flotation and oxidizing of fat-containing waste water is to be achieved.

The use of the peracid compositions of this invention in the treatment of fat-containing waste waters has a number of advantages. Among these is the fact that all of the ingredients are "generally recognized as safe" by the Food and Drug Administration and can be utilized without concern that they may find their way into the food chain. The possibility that this will happen is relatively small, since the biodegradability of the compositions is relatively good. Further, the peracid compositions have significant flocculating properties and provide a "lift" comparable to other commercially available flocculating agents used for this purpose.

In addition, the peracid compositions result in improved products from the separation process. In fact, this may be one of the primary benefits of the invention. For example, the substitution of peracetic acid for polymers used to assist flocculation in fat-containing waste waters improved the product from a red/brown color to bleachable fancy—color of 11A or better, 4% or less FFA.

Peracids also improve the quality of the purified waste water effluent by reducing microbial material present and BOD. The material controls TKN levels and BOD levels as well as odor and microorganisms in plant effluent. Ferrous sulfate may be used to accelerate the action of the peracid composition, particularly in its oxidation effect. A substantial reduction, i.e., less than one-half, of the amount of peracid composition can be utilized, or a faster rate achieved, if ferrous sulfate is added. Any source of ionic iron will work in the same manner as the sulfate salt. Dose rates should be approximately 5 to 50 ppm ferrous sulfate per amount of waste water, although any amount that effectively enhances the activity of the peracid can be employed.

The novel process and compounds of our invention are illustrated by the following examples:

EXAMPLES

Example 1: A waste water pilot plant test was conducted at a commercial meat-packing plant having the capacity to slaughter up to 5000 head of cattle daily. A system was devised to run in parallel with the existing full scale waste treatment system during normal operation. The feed consisted of waste water from various operations in the meat-packing plan including "wash down" containing large amounts of fat-containing materials, such as, blood, fecal material and other animal remnants. The temperature of the feed stock ranged from 90–100 degrees F.

Equipment: A split stream from the feed to the full scale system was pumped at 36 gallons per hour through a series of two vessels. The vessels were constructed from two 55 gallon metal drums, modified to provide a recycle rate of 25%. The recycle stream had air fed prior to the recycle pumps to provide weak, dispersed air flotation from a manifold near the bottom of the vessel. Levels were controlled at the 50 gallon mark on vessel 1 with the output to vessel 2 and at the 50 gallon mark on vessel 2. Flotation material was collected by spillways cut into the drums at the 50 gallon mark. Piping consisted of ½" i.d. iron.

Procedure: Flocculation was carried out utilizing a commercially available product known under the trademark "Super Flock" available from the Birko Corporation, Henderson, Colo. Then the pH was adjusted to 8 by introduction of another commercially available product known under the trademark "Sewage Splitr," also available from Birko at the entry to vessel 1. The following composition according to the invention was injected at the entry to vessel 2:

10% wt. acetic acid
15–20% wt. peracetic acid

17% wt. hydrogen peroxide
5% wt. phosphoric acid
0.1–1% wt. phosphonic acid derivatives bal. water Ferrous sulfate was added immediately thereafter. The dosages of these additive materials were as follows:

| Vessel 1: | |
|---|---|
| Super Flock (10%) | 5 ppm |
| Sewage Splitr | 25 ppm |
| Vessel 2: | |
| Composition | 100 ppm peracetic acid |
| Ferrous Sulfate (10%) | 25 ppm |

The mean retention time for each vessel was 1.5 hours.

Results: 50% of the fat in the feed stock was recovered in vessel 1. An additional 46% of the fat in the feed stock was recovered in vessel 2. Absent the composition of this invention, only trace amounts of fat would collect at the top of vessel 2 for recovery, the balance being lost to discharge. The fat concentrate withdrawn from vessel 2 was noticeably whiter than that recovered from vessel 1. The composite sample could be rendered directly to a tallow product saleable as "white grease." The composite sample, when blended into plant render stock at a typical 5%, yielded a bleachable "fancy grade" tallow. These results demonstrate that fat recoveries can be improved even in weak mechanical flotation conditions by the addition of the compositions of the present invention. The higher grade of fat recoverable with the invention sells at a higher price. Improved recovery and grade of recovered material translate into economic gain for the user.

The incoming feed stock and effluent from vessel 2 were compared with respect to the following important characteristics.

| Characteristic | Feed Stock | Discharge |
|---|---|---|
| BOD | 10,000 ppm. | 1850 ppm. |
| COD | 14,200 ppm. | 2200 ppm. |
| TSS | 6,700 ppm. | 240 ppm. |
| FOG | 4,130 ppm. | 80 ppm. |
| TKN | 333 ppm. | 240 ppm. |
| Flow rate | 36.0 gpm. | 35.6 gpm. |

The discharge flow rate is less than the feed rate, because approximately 0.5 gallon per hour reported to the flotation product in the form of fat, oil, and grease (FOG) and entrained water. BOD, COD, TSS, FOG and TKN are important waste water criteria. The amount of "penalty fee," if any, which will be assessed by a local water department is determined by a combination of some or all of these criteria. The reduction of these numbers utilizing the present invention benefits the environment and reduces the penalty fees that must be paid by the user.

Example 2: Based on the impressive performance in the previous test, it was decided to observe the performance of the composition of this invention as the sole waste water treatment additive.

Equipment: Same as in the previous example.

Procedure: The peracetic acid containing composition identified in the previous example was added just prior to vessel 1 at the target rate of 100 ppm active peracetic acid. In this instance, the flotation product was "creamier," i.e., had more water and air, and was extremely white in color. The volume of material recovered from vessel 1 was increased, and there was a significant volume on vessel 2. The total volume rates were comparable to the first run. This test proceeded for part of one eight hour shift at the plant.

Results: Based on the quality and quantity of the product, it is apparent that the use of peracetic acid compositions of this invention by themselves are effective in the treatment of fat-containing waste water.

Example 3: Examples of three separate peracid compositions based on perbutyric acid, percitric acid and perproprionic acid were made in the laboratory according to the following formula:

20.0% wt. peracid precursor
64.4% wt. hydrogen peroxide (35% aqueous)
6.7% wt. phosphoric acid (75% aqueous)
7.9% wt. distilled water
1.0% wt. aminotri(methylenephosphonic acid) (50% aqueous)
bal. water The samples were allowed to equilibrate over the weekend in the lab, then were taken to a local meat packing plant. Performance in wastewater was qualitatively assessed with the following test:

A 2 gallon sample of wastewater was taken and split into 5×1000 ml, the remainder discarded. To each sample was added 50 grams of equilibria, amounting to 100 ppm of (peracid+peracid precursor). The solutions were gently stirred and allowed to stand for observation. This was done for the three lab equilibria and an equilibrium mixture of peracetic acid and acetic acid. A fifth sample was held for control. In every case of chemical addition, the water clarified under a flotation product in less than 15 minutes. The control showed a slight amount of natural fat separation, but did not clarify. It was concluded that the other peracids functionality contributed to collection and flotation of the fat in the same manner as peracetic acid.

The description and examples set forth herein are intended to illustrate representative embodiments of the invention. The claims which follow are not intended to be limited to the specific disclosed embodiments. The invention is susceptible to modification, variation and change without departing from the proper scope or fair meaning of the following claims.

We claim:

1. A process for the separation and purification of fat-containing waste water by physically separating and oxidizing the waste water, comprising:

adding an effective flocculating and oxidizing amount of a composition comprising:
10–30% wt. peracid precursor
15–70% wt. hydrogen peroxide
1–10% wt. phosphoric acid
bal. water and recovering at least one fat comprising segment from said waste water.

2. The process of claim 1 in which the peracid precursor is at least one member selected from the group consisting of perbutyric acid, percitric acid, perproprionic acid and peracetic acid.

3. The process of claim 2 in which the composition also comprises 0.1–1 wt. % of a peracid stabilizer selected from the group consisting of phosphonic acid derivatives, picolinic acid and sequestering agents that tightly bind trace metals.

4. The process of claim 3 in which the peracid stabilizer is a phosphonic acid derivative.

5. The process of claim 3 which also includes the addition of a divalent metal ion in an effective amount to accelerate oxidation of the waste water.

6. The process of claim 5 in which the divalent metal ion is ferrous sulfate.

7. The process of claim 2 in which the fat-containing waste water is the effluent from a meat-packing plant.

8. The process of claim 2 in which the composition is continuously added in an amount of from 20–150 ppm. active peracid based on the amount of waste water.

9. The process of claim 7 in which the composition also comprises 0.1–1 wt. % of a peracid stabilizer selected from the group consisting of phosphonic acid derivatives, piccolinic acid and sequestering agents that tightly bind trace metals.

10. The process of claim 9 in which the peracid stabilizer is a phosphonic acid derivative.

11. The process of claim 7 which also includes the addition of a divalent metal ion in an effective amout to accelerate oxidation of the waste water.

12. The process of claim 11 in which the divalent metal ion is ferrous sulfate.

13. The process of claim 2 in which the composition comprises:

20.0% wt. peracid precursor
64.4% wt. hydrogen peroxide
6.7% wt. phosphoric acid
7.9% wt. distilled water
1.0% wt. aminotri(methylenephosphonic acid)
bal. water.

14. The process of claim 13 in which the fat-containing waste water is the effluent from a meat-packing plant.

15. The process of claim 14 which also includes the addition of ferrous sulfate in an amount of approximately 5 to 50 ppm ferrous sulfate per amount of waste water.

* * * * *